Figure 1:
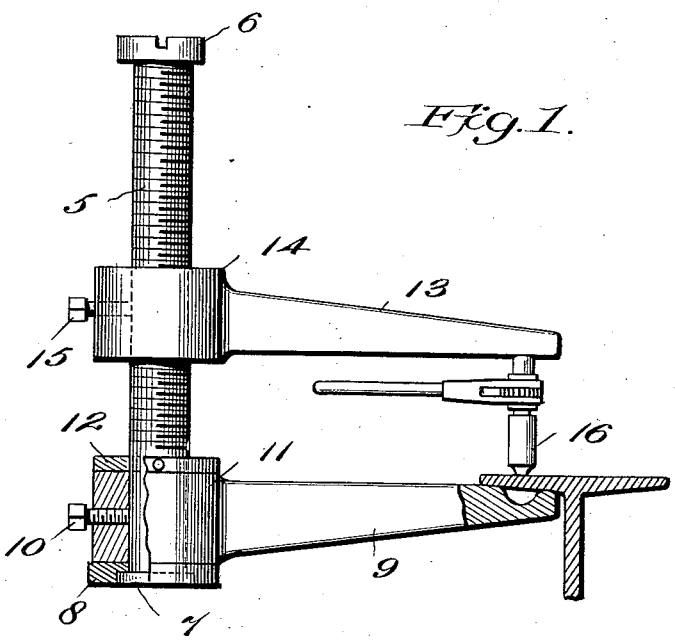

G. C. LUDGATE.
ADJUSTABLE DOG.
APPLICATION FILED JUNE 4, 1912.

1,060,915.

Patented May 6, 1913.

Witnesses
C. James Cronin
Madeline Michel

Inventor
George C. Ludgate
By Victor J. Evans
Attorney

UNITED STATES PATENT OFFICE.

GEORGE C. LUDGATE, OF BROOKLYN, NEW YORK.

ADJUSTABLE DOG.

1,060,915.  Specification of Letters Patent.  Patented May 6, 1913.

Application filed June 4, 1912.  Serial No. 701,599.

*To all whom it may concern:*

Be it known that I, GEORGE C. LUDGATE, a citizen of the United States, residing at Brooklyn, in the county of Kings and State of New York, have invented new and useful Improvements in Adjustable Dogs, of which the following is a specification.

This invention relates to adjustable dogs or clamps for holding tools or other devices, while certain operations are being performed and consists of arms carried by a shaft on which they may be adjusted with relation to each other so as to hold the tool or work, as will be more fully described in the following specification, set forth in the claim and illustrated in the drawings, wherein:—

Figure 2:
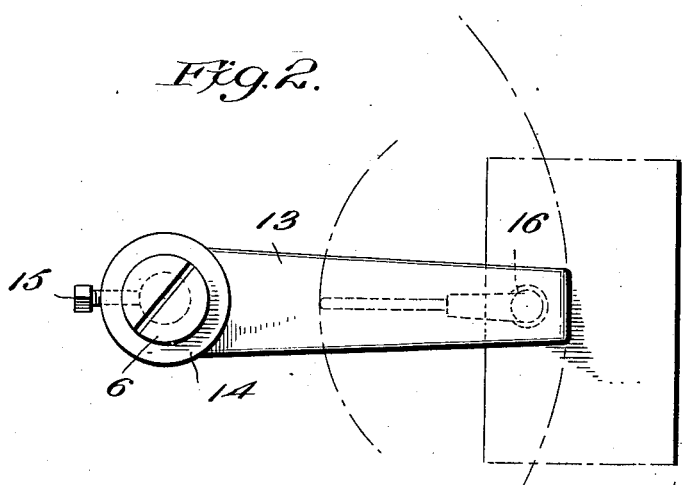

Figure 1 is a side elevation of the device partly in section. Fig. 2 is a plan view of the improved dog.

As will be seen in Fig. 1, the device is especially adapted for use in connection with the operation of tools such as drills or other boring tools, and it is shown as holding a metal drill which is being used to perforate the flange of a metal bead. The device consists of a stem or shaft 5 having a slotted head 6 and screw threads throughout its length. The lower end is also provided with a head 7 carrying the washer 8 to retain thereon an arm 9 which is free to move and may be swiveled in any direction and retained permanently by the set screw 10. Above the hub 11 of the arm 9 is secured a ring or washer 12 so that the arm 9 is permitted to swing about the shaft but its longitudinal movement along the shaft is prevented by the two washers.

A second arm 13 is provided and the perforation within its hub 14 is threaded to receive the screw 5 and be adjusted thereon. After having been adjusted to its proper degree it may be held rigid by means of the set screw 15 so as to retain the drill 16 or any other tool within its grasp.

While adjusting the arms to the proper relationship the screw may be turned by means of the slot in the head 6 or the arm 13 may be rotated around the screw until the proper distance is secured between them when they may be held rigid by the set screws as above described.

It is obvious that the shape of the jaws may be modified and the details otherwise altered without departing from the essential features above described.

What I claim as new is;—

In an adjustable dog, the combination of a screw-threaded shaft having a head at each end, the upper of said heads being provided with a slot, a counter-sunk collar mounted on the lower of the heads, a jaw journaled on the shaft and resting on the said lower head, means for preventing longitudinal movement of the said jaw and including a second collar mounted on the shaft and bearing against the said jaw, a second jaw screw threaded on the shaft and positioned by being rotated on the screw-threads of the said shaft, and a set screw inserted in each jaw to prevent the angular movement of each jaw when spaced with relation to each other.

In testimony whereof I affix my signature in presence of two witnesses.

GEORGE C. LUDGATE.

Witnesses:
JULIUS LEVY,
JAMES F. DUHAMEL.

Copies of this patent may be obtained for five cents each, by addressing the "Commissioner of Patents, Washington, D. C."